(12) United States Patent
Celinski et al.

(10) Patent No.: US 11,047,965 B2
(45) Date of Patent: Jun. 29, 2021

(54) PORTABLE COMMUNICATION DEVICE WITH USER-INITIATED POLLING OF POSITIONAL INFORMATION OF NODES IN A GROUP

(71) Applicant: Loose Cannon Systems, Inc., Ross, CA (US)

(72) Inventors: Peter Celinski, San Francisco, CA (US); Aiden Riley Eller, Seattle, WA (US); George Bulatov, Campbell, CA (US); Evan Stuart, Hong Kong (CN)

(73) Assignee: Loose Cannon Systems, Inc., Ross, CA (US)

( * ) Notice: Subject to any disclaimer, the term of this patent is extended or adjusted under 35 U.S.C. 154(b) by 0 days.

(21) Appl. No.: 16/655,057

(22) Filed: Oct. 16, 2019

(65) Prior Publication Data

US 2020/0110162 A1 Apr. 9, 2020

Related U.S. Application Data

(63) Continuation of application No. 16/115,272, filed on Aug. 28, 2018, now Pat. No. 10,451,719, and a
(Continued)

(51) Int. Cl.
*G01S 11/06* (2006.01)
*H04W 4/029* (2018.01)
(Continued)

(52) U.S. Cl.
CPC ............. *G01S 11/06* (2013.01); *G01S 5/0284* (2013.01); *G06F 16/29* (2019.01);
(Continued)

(58) Field of Classification Search
CPC ......... H04W 4/023–029; H04W 4/026; H04W 4/029; H04L 65/4069; H04L 67/18;
(Continued)

(56) References Cited

U.S. PATENT DOCUMENTS

| 4,941,187 A | 7/1990 | Slater |
| 8,121,057 B1 | 2/2012 | Botha et al. |

(Continued)

FOREIGN PATENT DOCUMENTS

| EP | 2020777 | 2/2009 | |
| EP | 2020777 A1 * | 2/2009 | ............ H04M 3/567 |

OTHER PUBLICATIONS

European Office Action for European Application No. 16815251.0, dated Feb. 4, 2020.
(Continued)

*Primary Examiner* — Raymond S Dean
(74) *Attorney, Agent, or Firm* — Carmen C. Cook

(57) ABSTRACT

A portable communication device implements a position indication method to determine and convey the relative locations of other portable communication devices in a group. In one embodiment, the portable communication devices are equipped with a GPS sensor and the position indication method determines relative locations of devices using GPS location data. In another embodiment, the portable communication devices determine relative locations of devices using the strength of the received signal as a proxy for distance. In some embodiments, the relative location information is conveyed to each portable communication device by modifying the audio signal playback. For example, a 3D audio playback may be used to convey the relative location information. In other embodiments, other non-audible location indication may be provided on each portable communication device.

17 Claims, 10 Drawing Sheets

Related U.S. Application Data continuation-in-part of application No. 15/190,062, filed on Jun. 22, 2016, now Pat. No. 10,237,317.

(60) Provisional application No. 62/552,782, filed on Aug. 31, 2017.

(51) Int. Cl.

| | | |
|---|---|---|
| *H04L 29/06* | (2006.01) | |
| *H04W 4/02* | (2018.01) | |
| *G01S 5/02* | (2010.01) | |
| *H04L 12/18* | (2006.01) | |
| *G06F 16/29* | (2019.01) | |
| *H04L 29/08* | (2006.01) | |

(52) U.S. Cl.
CPC ...... *H04L 12/1822* (2013.01); *H04L 12/1827* (2013.01); *H04L 65/4069* (2013.01); *H04L 65/604* (2013.01); *H04L 67/18* (2013.01); *H04W 4/023* (2013.01); *H04W 4/029* (2018.02); *H04W 4/026* (2013.01)

(58) Field of Classification Search
CPC ............... H04L 65/604; H04L 12/1822; H04L 12/1827; G01S 5/0284; G01S 11/06; G06F 16/29
See application file for complete search history.

(56) References Cited

U.S. PATENT DOCUMENTS

| | | | |
|---|---|---|---|
| 8,433,050 B1 | 4/2013 | Baten et al. | |
| 9,036,510 B1 | 5/2015 | Zhou et al. | |
| 9,674,661 B2* | 6/2017 | Chu .................... | H04W 4/023 |
| 2003/0158900 A1 | 8/2003 | Santos | |
| 2005/0088981 A1 | 4/2005 | Woodruff et al. | |
| 2005/0136837 A1 | 6/2005 | Nurminen et al. | |
| 2005/0143103 A1 | 6/2005 | Bjorgan et al. | |
| 2005/0260988 A1 | 11/2005 | Kauppinen | |
| 2006/0083388 A1 | 4/2006 | Rothschild | |
| 2006/0229093 A1 | 10/2006 | Bhutiani | |
| 2006/0268753 A1 | 11/2006 | Tidwell et al. | |
| 2008/0119227 A1 | 5/2008 | Cheng | |
| 2008/0140314 A1* | 6/2008 | Park ....................... | G01C 21/00 |
| | | | 701/469 |
| 2009/0276214 A1 | 11/2009 | Chong et al. | |
| 2010/0029302 A1* | 2/2010 | Lee ....................... | H04W 4/029 |
| | | | 455/456.6 |
| 2010/0124321 A1 | 5/2010 | Alexandrov et al. | |
| 2011/0136431 A1 | 6/2011 | Haaramo et al. | |
| 2012/0040646 A1 | 2/2012 | Garg et al. | |
| 2012/0173620 A1 | 7/2012 | Holostov et al. | |
| 2013/0293666 A1 | 11/2013 | Jiang et al. | |
| 2013/0328762 A1* | 12/2013 | McCulloch ............. | G06F 3/017 |
| | | | 345/156 |
| 2014/0040623 A1 | 2/2014 | Conus et al. | |
| 2014/0094119 A1 | 4/2014 | Stojanovski et al. | |
| 2014/0105096 A1 | 4/2014 | Wang et al. | |
| 2014/0160996 A1 | 6/2014 | Hellhake et al. | |
| 2014/0282094 A1 | 9/2014 | Levine | |
| 2014/0362742 A1 | 12/2014 | Martinez et al. | |
| 2014/0369491 A1 | 12/2014 | Kloberdans et al. | |
| 2015/0072724 A1 | 3/2015 | Janovskiy | |
| 2015/0331081 A1* | 11/2015 | Wharton ............ | G01C 21/3632 |
| | | | 342/443 |
| 2016/0066117 A1* | 3/2016 | Chen ...................... | H04R 5/027 |
| | | | 381/26 |
| 2016/0088417 A1* | 3/2016 | Kim ........................ | H04S 1/005 |
| | | | 381/17 |
| 2016/0373501 A1 | 12/2016 | Celinski et al. | |
| 2016/0373583 A1 | 12/2016 | Celinski | |
| 2016/0373899 A1 | 12/2016 | Celinski et al. | |
| 2017/0282062 A1* | 10/2017 | Black .................... | A63F 13/323 |

OTHER PUBLICATIONS

European Office Action for European Application No. 16815247.8, dated Feb. 4, 2020.
European Office Action for European Application No. 16815252.8, dated Feb. 7, 2020.
Ritter, Benno, "ZigBee: Solutions for Today, Building for Tomorrow", Presentation From ZigBee European Telecommunications Standards Institute, Jul. 9, 2010, 38 pgs.
Extended European Search Report for EP Application No. 16815247.8, dated Dec. 19, 2018, 11 pgs.
Extended European Search Report for EP Application No. 16815251.0, dated Dec. 19, 2018, 11 pgs.
Extended European Search Report for EP Application No. 16815252.8, dated Dec. 19, 2018, 11 pgs.
International Search Report and Written Opinion for International Applicatin No. PCT/US2016/038828, dated Nov. 17, 2016, 8 pgs.
International Search Report and Written Opinion for International Application No. PCT/US2016/038833, dated Nov. 22, 2016, 10 pgs.
International Search Report for International Application No. PCT/US2016/038834, dated Nov. 22, 2016, 8 pgs.
Seifert, "The Onyx is a 'Star Trek' communicator for the real world," Nov. 5, 2014, retrieved from www.theverge.com/2014/11/5/7157291/onbeep-onyx-personal-communicator on Feb. 16, 2017, 5 pgs.

* cited by examiner

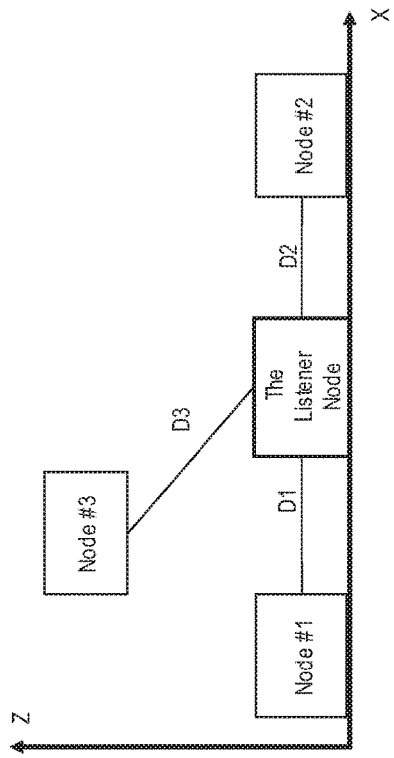
FIG. 10(c)
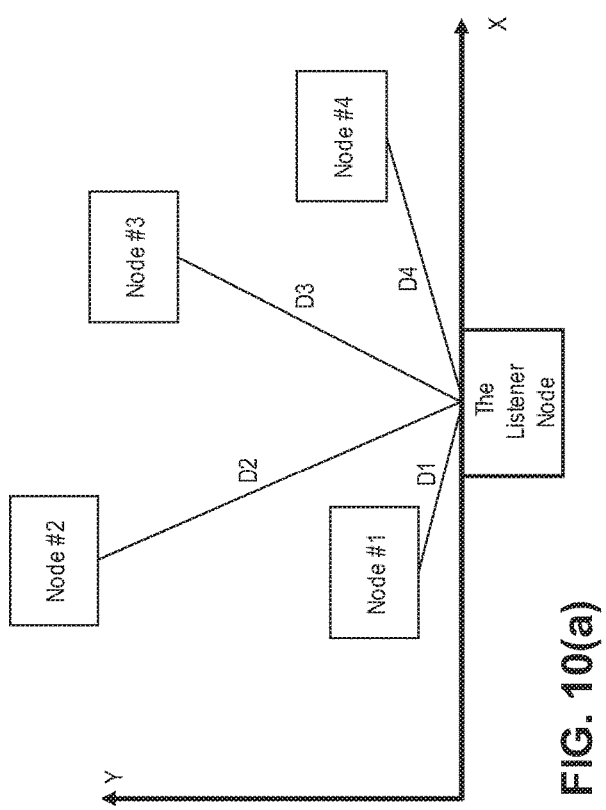
FIG. 10(a)
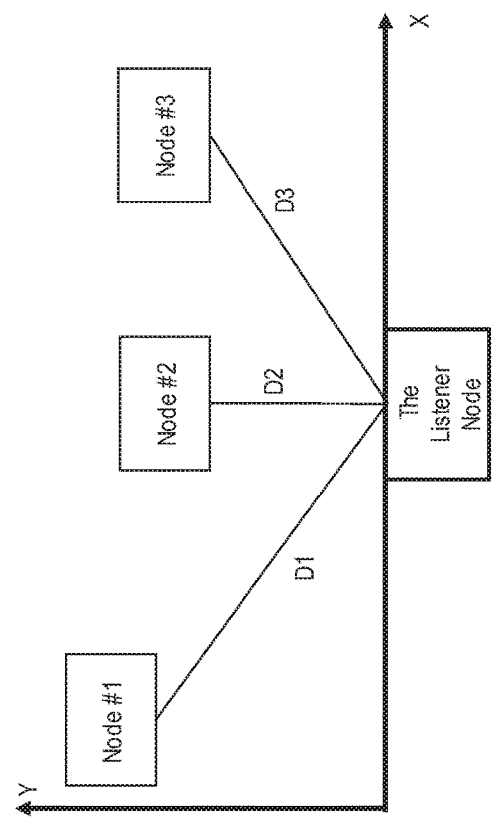
FIG. 10(b)
FIG. 10

PORTABLE COMMUNICATION DEVICE WITH USER-INITIATED POLLING OF POSITIONAL INFORMATION OF NODES IN A GROUP

CROSS REFERENCE TO RELATED APPLICATIONS

This application is a continuation of U.S. patent application Ser. No. 16/115,272, entitled SYSTEM AND METHOD TO INDICATE RELATIVE LOCATION OF NODES IN A GROUP, filed Aug. 28, 2018, now U.S. patent application Ser. No. 10/451,719, issued Oct. 22, 2019, which claims priority to U.S. Provisional Patent Application No. 62/552,782, entitled METHOD TO INDICATE RELATIVE LOCATION OF MEMBERS AND DEVICES, filed Aug. 31, 2017, which are incorporated herein by reference for all purposes.

This application is a continuation-in-part of U.S. patent application Ser. No. 15/190,062, entitled PORTABLE GROUP COMMUNICATION DEVICE AND METHOD OF USE, filed Jun. 22, 2016, now U.S. Pat. No. 10,237,317, issued Mar. 19, 2019, which is incorporated herein by reference for all purposes.

The present application is related to commonly assigned U.S. patent application entitled PORTABLE GROUP COMMUNICATION DEVICE AND METHOD OF USE, filed Jun. 22, 2016, having at least one common inventor thereof, having patent application Ser. No. 15/190,111, now U.S. Pat. No. 10,003,625, issued on Jun. 19, 2018, which patent application is incorporated herein by reference in its entirety.

The present application is related to commonly assigned U.S. patent application entitled PORTABLE GROUP COMMUNICATION DEVICE HAVING AUDIO PLAYBACK AND/OR PHONE CALL CAPABILITY, filed Jun. 22, 2016, having at least one common inventor thereof, having patent application Ser. No. 15/190,066, which patent application is incorporated herein by reference in its entirety.

FIELD OF THE INVENTION

The invention relates to wireless communication devices and, in particular, to wireless portable group communication devices and methods to interpret position information to improve user experience of the wireless communication devices.

BACKGROUND OF THE INVENTION

Many different communications devices currently exist. However, each is suitable only for certain applications. For example, cellular telephones are useful for one-to-one communication, but do not typically lend themselves well to group communication, i.e. conversations involving more than two individuals at the same time. Devices such as walkie-talkies and other two-way radio systems suffer from similar drawbacks, in addition to often being half-duplex (meaning that only one person may speak at a time) rather than full-duplex (allowing two or more individuals to speak simultaneously), cumbersome to use, not secure, providing poor voice quality, having limited range, and other drawbacks. Some telecommunications devices allow for conference calling, but these devices are typically not portable or require a backbone network such as a cellular network.

Accordingly, ongoing efforts thus exist to create useful portable group communications devices.

BRIEF DESCRIPTION OF THE DRAWINGS

Various embodiments of the invention are disclosed in the following detailed description and the accompanying drawings.

FIG. 10, which includes FIGS. 10(a) to 10(c), is a plot illustrating the distributed positioning of the nodes using the RSSI-based method of determining relative positions of the nodes in some examples.

DETAILED DESCRIPTION

Figure 1:
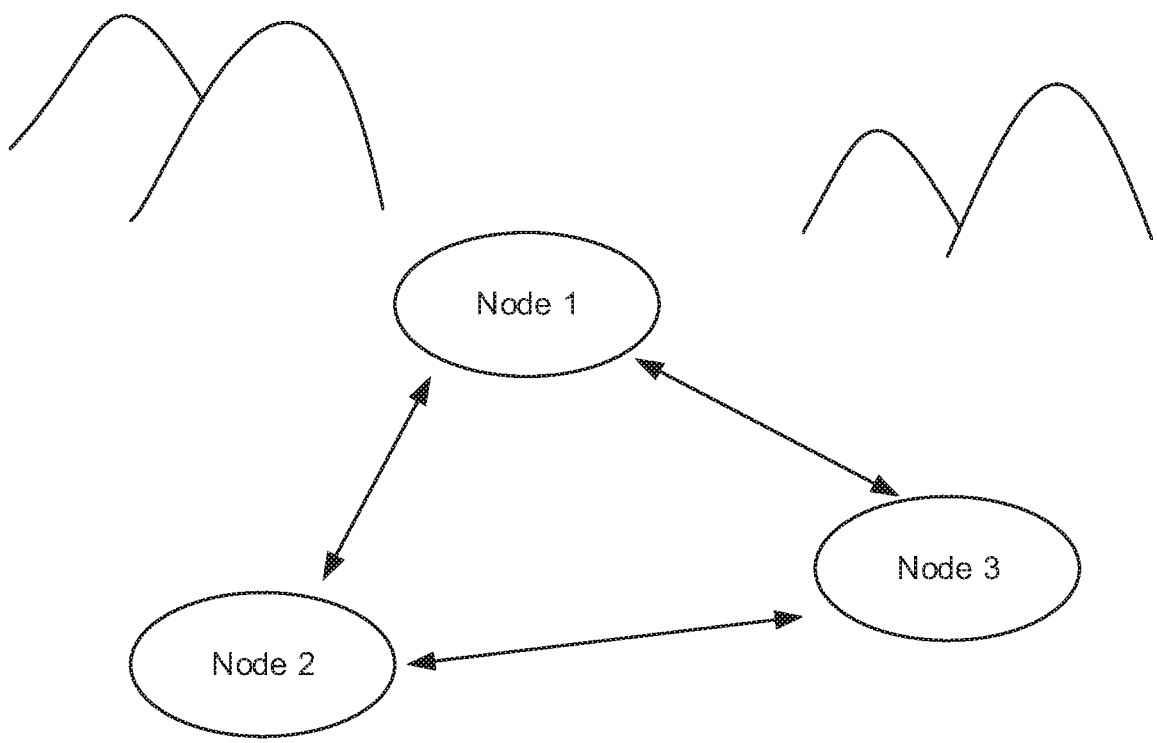
FIG. 1 illustrates an environment in which the portable communication devices are deployed in some examples.

The invention can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a portable communication device implements a position indication method to interpret position information of other portable communication devices in a group and convey the relative locations of the other portable communication devices in the group to the user through the portable communication device. The position indication method improves user experience by enabling the user of the portable communication device to have awareness of the relative locations or positions of other members of the group with which the user is engaging in voice communication. In some embodiments, the position indication method interpret the position information using directional audio to virtually place the other portable communication devices in a virtual three dimensional or two dimensional space. In this manner, the user of the portable communication device can distinguish the other speakers in the voice communication by direction, and/or estimated distance and direction to the other speakers.

In one embodiment, the portable communication devices are equipped with a GPS receiver and the position indication method determines relative locations of the other devices using GPS location data. In another embodiment, the portable communication devices determine relative locations of the other devices using radio-based position estimation methods, such as using the strength of the received signal as a proxy for distance. Radio-based position estimation methods includes Received Signal Strength Indicator (RSSI), triangulation or other radio-based techniques. In some embodiments, the relative location information is conveyed to each portable communication device by modifying the audio signal playback. For example, a 3D audio playback may be used to convey the relative location information. In other embodiments, other location indication schemes may be used, such as providing a ping to indicate the direction or distances to another device.

In some embodiments, the position indication method is implemented in portable communication devices that are configured to enable group communication among a group of the portable communication devices. In some embodiments, the portable communication devices are implemented as described in copending and commonly assigned U.S. patent application Ser. No. 15/190,062, entitled PORTABLE GROUP COMMUNICATION DEVICE AND METHOD OF USE, which application is incorporated by reference in its entirety. As described in the '062 application, the portable communication device enables full-duplex radio communication with another one of the portable communication device that have joined a group. Details of the portable communication device and the operation methods are described in the '062 patent application.

FIG. 1 illustrates an environment in which the portable communication devices are deployed in some examples. Referring to FIG. 1, two or more portable communication devices are deployed in an environment to enable group communication between devices that have joined a group. Each portable communication device is associated with a user and supports full-duplex communication with any other portable communication device over a wireless medium. Users of the portable communication devices initiate a group formation process to join other portable communication devices to form a group. With a group of users and devices thus formed, the portable communication devices enable the users to be in radio contact with members of the group and to communicate over significant distances in a "group conference" manner in which all users may speak and hear each other at the same time.

In the present description, each user or the associated portable communication device in a group may be referred herein interchangeably as a "member" or "group member" or "participant" and a portable communication device in such a group is referred herein as a "device". Furthermore, members and devices are collectively referred to as "nodes".

In FIG. 1, three portable communication devices, denoted Nodes 1 to 3, are illustrated as being deployed in an outdoor environment. There are situations in which people participate in activities, work, cooperate or otherwise interact as part of a group and where it is valuable to the participants to have awareness of the relative locations of other participants and devices within the group. Such situations or applications may include groups of people participating in action sports such as skiing, commercial situations such as construction, military operations or others.

In some cases, the participants may be operating equipment such as vehicles or robots or other devices, including airborne drones. For example, where an autonomous or partially autonomous drone is being used, such as while filming footage during skiing, it may be desirable to provide awareness of the position of the drone to facilitate improved photography or video footage capture, or a sense that the drone is correctly following the skier.

In embodiments of the present invention, the portable communication device implements a position indication method to interpret the relative locations of nodes, and to convey to each member the positions of one or more other nodes relative to the member. In some embodiments, the method is further configured to establish and track the head orientation of the user of the portable communication device and to use the head orientation information to adjust the relative locations of the other nodes.

In one embodiment, where the members are engaging in voice communication with each another via radio communication using the portable communication devices, the position of other nodes may be conveyed by manipulating at each member (or the receiver at each device) the received voice audio signal. Such manipulation may be based on the positional information of other nodes and the head orientation of the receiver. The position of other nodes may also be conveyed using other audible or non-audible indicators. For example, the position of other nodes may be conveyed using locally generated sounds to indicate the positions of the other nodes. In one example, a "ping" sound over the headphones of the user may be used to indicate the direction or distance to another member. In another example, the position information may be conveyed through a visual display on the portable communication device of the user. In one example, the position information of the other nodes may be provided by displaying the locations of other nodes on a map provided on a display screen of the portable communication device or on the display screen of a mobile device connected to the portable communication device.

In one example, the user of a portable communication device may poll for the positional information of the other nodes in the group. In response to the user-initiated polling, the position indication method obtains and interprets the relative locations of the other nodes in the group and convey the positional information to the user through the portable communication device. In this case, instead of manipulating the received voice audio signal, the position indication method may use a locally generated sound to indicate the relative locations of the other nodes. Alternately, the position indication method may use a visual display to show the relative locations of the other nodes.

In one example, the user of a portable communication device poll for the location of another node by issuing a voice command, such as "Hey, where is Mary?." The position indication method provides a ping sound over the headphones of the user to indicate the direction to Mary.

In the present description, relative location or position refers to a combination of relative direction and distance from a receiver of the subject node to another node. Relative location or relative position also refers to various approximations in the measurement of node positions, which may depend on the fidelity of the available positional information or estimation of the positional information, where such estimation may be based on an interpolation based on prior position information, approximation in the measurement of direction and approximation in the measurement of speed where some nodes may be in motion, or some combination thereof.

Figure 2:
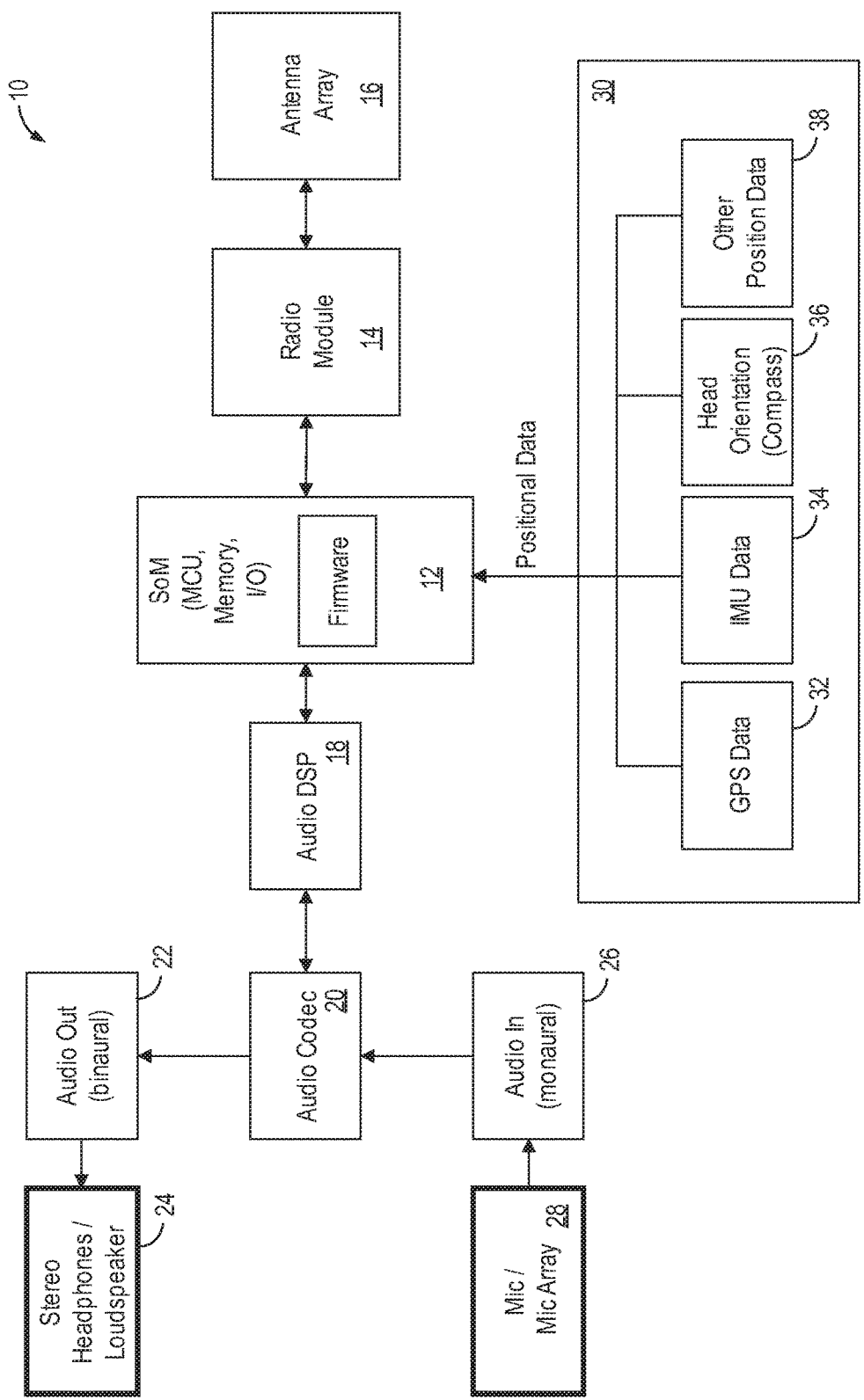
FIG. 2 is a block diagram illustrating a hardware architecture of a portable communication device in some embodiments.

FIG. 2 is a block diagram illustrating a hardware architecture of a portable communication device in some embodiments. Referring to FIG. 2, a portable communication device 10 includes a system on module (SoM) 12 implementing a microcontroller unit (MCU), a memory and input/output interface, and other functions. The MCU executes firmware or software to control the operation of the portable communication device. In some embodiments, the MCU may be implemented on a main ARM core with additional companion microcontroller core(s) and or digital signal processor (DSP).

The portable communication device 10 further includes a radio module 14 including a radio transceiver to transmit and receive the payload over the wireless medium. In some embodiments, the radio transceiver provides metrics such as Received Signal Strength Indicator (RSSI) and link quality. The radio module 14 transmits and receives radio signals through an antenna or an antenna array 16. The antenna array 16 provides for more accurate RSSI and enables optional phase shift.

The portable communication device 10 includes an audio digital signal processor (audio DSP) 18 for executing audio processing tasks, such as noise and echo cancellation. The audio DSP 18 is in communication with an audio codec (coder-decoder) 20 which encodes audio data to be transmitted and decodes audio data received. The audio DSP is optional and may be omitted in some embodiments of the present invention. In some embodiments, the audio codec 20 supports multiple signal routes, including analog in and out with analog-to-digital converter and digital-to-analog converter, Bluetooth connection, digital in from MEMS microphones and other signal routing methods. The audio codec 20 provides decoded incoming audio to an audio output driver 22. Audio output driver 22 performs mixing of the incoming audio from other nodes in communication with the portable communication device. The mixed audio signal is played out on an audio output device 24, such as stereo headphones or a loudspeaker. In some embodiments, the audio output driver 22 provides a binaural audio output with virtual positioning of audio streams. Binaural audio output realizes a 3-D stereo sound sensation for the listener and is usually realized in stereo headphones or loudspeaker with cross-talk cancellation.

The portable communication device 10 includes a microphone 28 for receiving incoming audio signals. The microphone 28 maybe a microphone array for beamforming. The microphone 28 provides the incoming audio signals to an audio input driver 26. In some embodiments, the audio input driver 26 receives and process monaural audio when the input audio is mainly human speech. The audio input driver 26 provides the incoming audio signals to the audio codec 20 for encoding.

To enable location determination, the portable communication device 10 receives positional data from one or more position-related sensors. In the present embodiment, a position information module 30 provides one or more forms of positional data. The positional information module 30 provides the positional information or data of the portable communication device 10 to the MCU of the SOM 12. The MCU embeds the positional information into the outgoing audio signal to be transmitted to other nodes in the group. The MCU in turn receive incoming audio signals from other nodes where the incoming audio signals are embedded with positional information of the other nodes. The MCU implements the position indication method of the present invention to process the positional information of the other nodes with its own positional information to determine the relative location of the other nodes relative to itself. In one embodiment, the MCU the provides the relative position indication through the audio output driver 22, as will be explained in more detail below.

In the present embodiments, the position information module 30 may receive GPS position data 32 from a GPS receiver. The GPS data may be generated by a GPS receiver embedded in the portable communication device 10 or the GPS data may be provided by a connected smartphone or other devices equipped with a GPS receiver.

In some embodiments, the position information module 30 may receive inertial measurement data 34 from an inertial measurement unit (IMU). The IMU may be embedded in the portable communication device 10 or the inertial measurement data may be provided by a connected smartphone or other devices equipped with an inertial measurement unit. The inertial measurement data measures orientation, position and velocity of the portable communication device.

In some embodiments, the position information module 30 may receive absolute head orientation data 36 from a compass. The compass may be a digital compass embedded in the portable communication device 10 or the orientation data may be provided by a connected smartphone or other devices equipped with a digital compass.

In other embodiments, the position information module 30 may receive other forms of positional data. For example, the position information module 30 may receive temperature data and/or barometer data. Barometer data can be used to provide information about relative height of the node. In another example, the position information module 30 may include buttons or touch control for receiving user control input.

Figure 3:
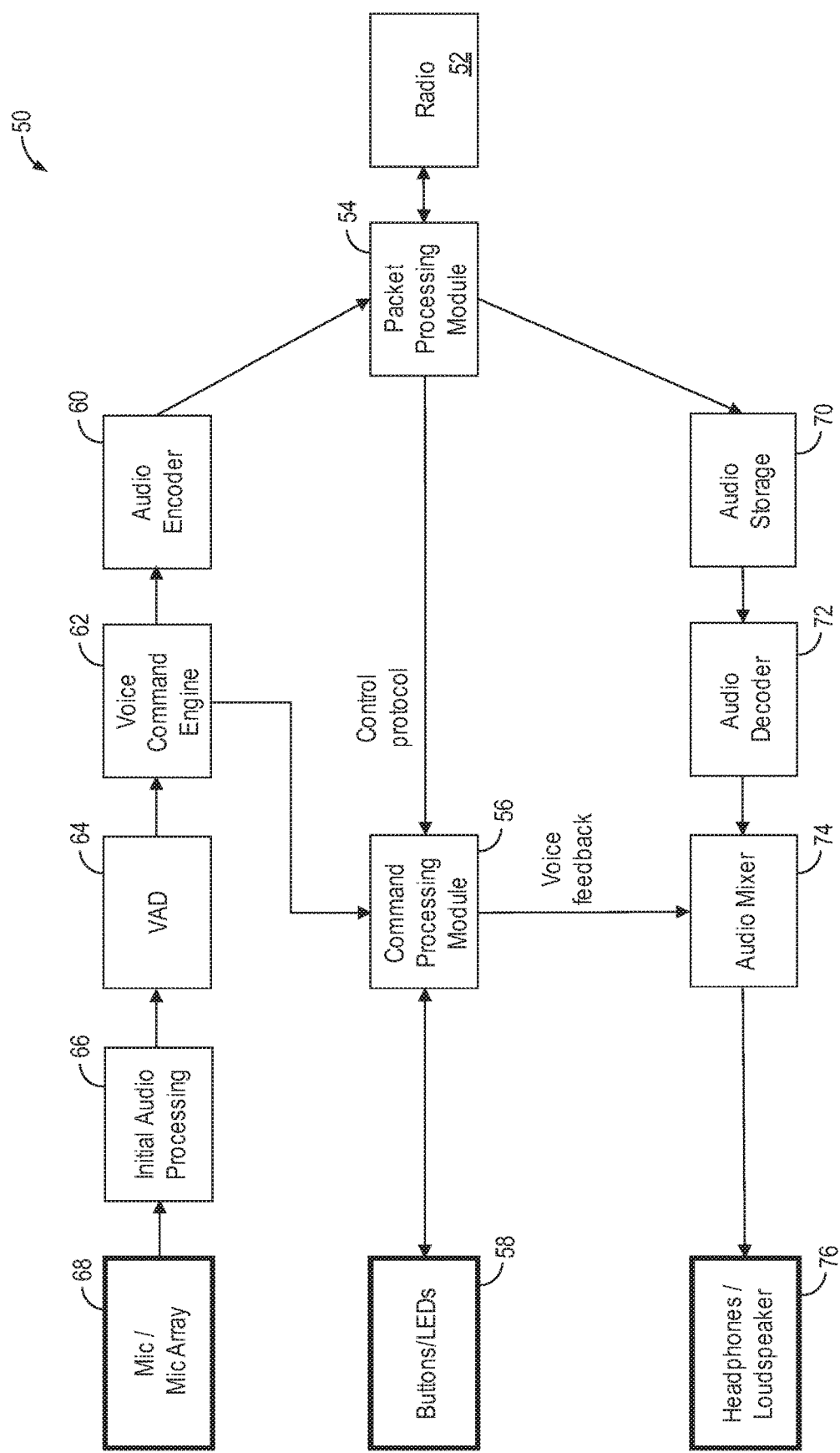
FIG. 3 is a functional diagram of the portable communication device in some embodiments.

FIG. 3 is a functional diagram of the portable communication device in some embodiments. FIG. 3 illustrates the functional elements of the portable communication device where the functional elements are implemented using the hardware components illustrated in the block diagram of FIG. 2. Referring to FIG. 3, a portable communication device 50 includes a radio 52 configured to send and receive data over a wireless medium. The radio 52 is in communication with a packet processing module 54. In one embodiment, the packet processing module 54 is implemented as a firmware component executed in the microcontroller unit (MCU) of the portable communication device. The packet processing module 54 encapsulates outgoing audio payload into networking packets to be transmitted by the radio 52.

The packet processing module 54 also extracts incoming audio payload from networking packets received from radio 52.

The packet processing module 54 also identifies control protocol packets. The portable communication device 50 includes a command processing module 56 configured to receive control protocol packets from the packet processing module 54. The command processing module 56 is also coupled to a user interface 58, which may include buttons or touch screen input/output interface to interact with a user. The user interface 58 may include LEDs or a display or other visual feedback devices to interact with the user. The command processing module 56 processes the control protocol packets to identify the input commands. The command processing module 56 generates instructions or issues input-output data in response to the control protocol packets and/or the input received from the user interface.

The portable communication device 50 receives audio signals to be transmitted (outgoing audio) on a microphone or a microphone array 68. The received audio signal is subjected to initial audio processing 66 which may be implemented in the audio driver and audio DSP. The audio driver provides an audio stream. The initial audio processing 66 may include beam forming, noise cancellation, and/or echo cancellation. The portable communication device 50 then performs voice activity detection (VAD) 64 on the received audio stream. The audio stream with voice activity detected is then processed by a voice command engine 62 which is configured to analyze the received audio stream to detect for certain wake-word and a command following the wake-word.

In some embodiments, the voice command engine introduces a given delay for catching the wake-word. If no wake-word is detected, the audio stream is passed to the next stage to be encoded and transmitted. If a wake-word is detected, the voice command engine waits for a giving delay for the command. During this time, the audio stream is NOT passed to the audio encoding engine. In this manner, a user may issue a command to the portable communication device while not exposing these commands to the other parties in the conversation.

For audio stream that does not contain a voice command, the audio stream is passed to the audio encoder or the audio encoding engine 60 to be encoded using an audio codec. In one example, the Opus software audio codec may be used. In particular, the packet processing module 54 performs group processing and encode the network packets using group-specific data. The encoded audio stream is then passed to the packet processing module 54 which encapsulates the audio payload into networking packets. The networking packets are then transmitted over the wireless medium by the radio 52.

The portable communication device 50 receives incoming audio signals on the radio 52. The incoming audio signals are processed by the packet processing module 54 which extracts the payload from the networking packets. In particular, the packet processing module 54 performs group processing and decodes the networking packets using group-specific data. The extracted audio payload is passed to an audio storage 70 which buffers the incoming audio data packets separately for each source node. In one example, the audio storage 70 can be implemented as a set of receive buffers with one receive buffer per source node.

The audio decoder 72 decodes the audio stream stored in the audio storage 70. In practice, the audio stream from each node is decoded separately. The decoded audio streams for all the nodes are provided to an audio mixer which mixes the several audio streams into one binaural stream. In some embodiments, comfort noise is added. In other embodiments, the command processing module 56 may control the audio mixer 74 to eliminate voice feedback. The mixed audio stream is provided to the headphones or a loudspeaker for playback. The headphones can be wired or wireless headphones.

With the portable communication device thus implemented, a group of portable communication devices may be deployed in an environment and engaging in full-duplex radio communication with each other in a group conference manner. In embodiments of the present invention, the portable communication device implements the position indication method to interpret position information and convey the relative locations of other portable communication devices in a group.

Figure 4:
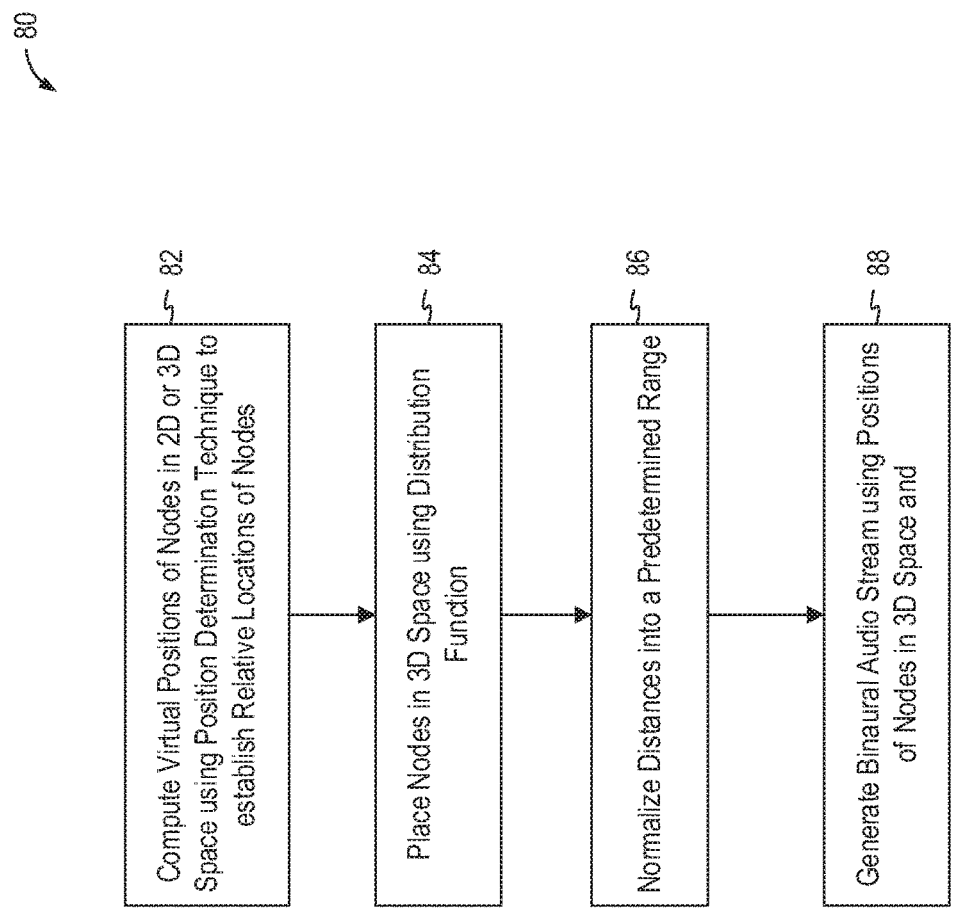
FIG. 4 is a flowchart illustrating the position indication method implemented in a portable communication device in some embodiments.

FIG. 4 is a flowchart illustrating the position indication method implemented in a portable communication device in some embodiments. First, the position indication method 80 computes the virtual positions of the other nodes in a two-dimensional or three-dimensional space using one or more of the position determination techniques (82).

In some embodiments, the relative locations of nodes in a group are established using the GPS (Global Positioning System) data associated with each of the nodes where the GPS data provides precise positional information of the nodes. The GPS data may be provided by an embedded GPS receiver in the portable communication device or a GPS receiver in a mobile phone or other device connected or coupled to the portable communication device. More specifically, because GPS data provides better resolution in the horizontal direction. Using GPS data allows the nodes to be placed in either a two-dimensional space or a three-dimensional space.

In some cases, the GPS data is available on a periodic basis (Sporadic GPS). In that case, the position determination may be made by interpolating the position between GPS-detected points using measurements from the inertial measurements unit (IMU). That is, the position determination can be implemented by combining accelerometer data with sporadic GPS data.

In cases where GPS data is not available, methods to estimate the positions of the nodes can be used. In one embodiment, the positions of the nodes are estimated using radio-based methods which estimate the direction and the distance from the subject node to the other nodes. Examples of radio-based methods include RSSI and link quality. Received Signal Strength Indicator (RSSI) uses the strength of the received radio signal as a proxy for distance. The signals used can be one or more of the received voice radio signal where a voice communication system is used or via the strength of a non-voice radio signal which is otherwise primarily intended to transmit voice data between nodes or between other devices at each node. In some embodiments, for a specific environmental situation, it may be possible to use GPS intermittently to establish a correlation between received signal strength and distance.

In another embodiment, relative location of nodes in a group may be established using radio signals and an antenna array, by measuring the time-difference of signal arrival at the antenna elements in the array. Such an array may be contained inside a device such as a voice transceiver unit or it may be part of a separate accessory in the form of an array composed of distributed antennas placed on clothing or separate devices mounted on a helmet, inside gloves, in a headphone strap or on other locations of the body of a member or at various points on a device.

In another embodiment, relative location of nodes in a group may be established by taking advantage of the distributed location of members in the group as well as the presence of three or more nodes in the group, where separation of members may enable effective triangulation of node locations.

In another embodiment, methods to estimate the positions of the nodes can rely on video analysis to predict the locations of nodes in a group. In some examples, relative location of nodes in a group may be established by using video or still-image capabilities of a non-airborne or an airborne overhead node, such as a drone, where the images or video footage captured by the drone may be analyzed to identify group members and calculate their relative position, and where the drone may then transmit this position information to the other nodes.

In the event that the position or location determination is made using the estimation methods, the resulting positional information is some approximation of each node's position, and the positional information may be only direction or distance, or both.

In some embodiments, the relative location determination methods described above may be enhanced by combining with map or terrain information, which may be used to determine the likely positional constraints of members and therefore improve the position estimation accuracy.

In some embodiments, the position determination methods may include other sensor data, such as an altimeter or barometer to measure altitude attained, to improve position computation.

Using one or more of the aforementioned position determination techniques, the nodes' positions are determined and tracked over time to provide better accuracy using extrapolation methods to position a node if some data packets are missing.

After the position determination, the nodes may be put in the exact position (in case of GPS data), or virtually placed in a three dimensional space using a given distribution function based on the position determination method used (84). For example, a uniform distribution in a front part of the horizontal plane with optional elevation may be used. In particular, when the position determination is made using a position estimation rather than a precise method such as GPS, it is simpler to use a uniform distribution to distribute the voices evenly in the virtual space rather than trying to place the voices in a real position.

In the present embodiment, the distances are normalized into a given range so all the nodes sound loud and clear (86). Normalizing the distance is carried out so that for nodes very far away, the audio will not be so faint that the user cannot hear that person while at the same time the position indication method is able to provide an understanding which node is closer and which node is further. In some embodiments, normalization of the distances can be omitted.

Finally, with the position of the nodes placed in the three dimensional space, a binaural audio stream is created from the received audio signals taking into consideration the node placement in the three dimensional space (88).

In some embodiment, the position indication method 80 further adjusts the node placement in virtual space accounting for the head movement or rotations. That is, the position indication method further establishes and tracks the orientation of the head of the user or the direction the portable communication device is facing. Alternately, the portable communication device may be embedded as an Application in a user interface device (such as a mobile phone) and the position indication method establishes and tracks the direction the user interface device is facing. The portable communication device or the user interface device may be used to indicate the position of other nodes. In the present description, the orientation of the head or the direction the device is facing is referred to collectively as the "head orientation." The head orientation is used to indicate the direction the user or the user's device is facing. In one embodiment, the head orientation can be determined using a digital compass.

In cases where only separation of the audio signals in the virtual space is needed, the node placement can be fixed and does not depend on the user's head orientation. In this case, the direction of other nodes is not important but rather it is only necessary to separate the voices so that the user can hear the other members "better" rather than exactly on top of each other in the middle of the ears. This may be combined with information on distance (and distance only, not direction to other nodes), so the voices are separated and the user gets a sense whether some nodes are further and some nodes are closer.

In some embodiment, the position indication method is configured to detect that other members are very close (e.g. sitting next to each other on a chairlift, or within a few meters) and the portable communication device will stop playing back the received voice streams from the nodes that are close by so as to eliminate the echo.

In embodiments of the present invention, the nodes in a group communicate their respective locations to other group members. In one embodiment, the location information is transmitted using a dedicated data layer of the voice communication link or of another data network. In another embodiment, the location information may be added to network data packets, such as voice data packets.

To enhance the accuracy of the position tracking, the nodes may implement a system of timing, such as a distributed clock or global system clock. In some embodiments, the system timing may be implemented using protocols such as Network Timing Protocol (NTP), Precision Timing Protocol (PTP) or other methods such as global clock from GPS.

In embodiments of the present invention, the position indication method provides real-time node position tracking, real-time receiver head orientation tracking and real-time received voice stream manipulation, thereby providing the user of a subject node with a real-time sense of position of the other node(s) in the group.

In one embodiment, the positional indication may be provided by approximation, by way of zones or other spatial approximations. One such zone arrangement may be in the form of four quadrants relative to the receiver, with each quadrant being approximately "in front", "behind", "to the left", "to the right". Such approximations may still be useful, particularly in practical situations where high precision is not needed. For example, establishing direction to within 90-degrees and distance to within 10's of meters accuracy may be sufficient to know where to look for a person or pose for a node that may be a flying drone carrying a camera.

In some embodiments, the positional indication may be performed periodically or in regular time intervals. The position indication may be in the form of audible or visual indicators that are not related to the received speech, such as short beeps or other signals. In one embodiment, positional information may be provided to a member at the member's initiated request, where the member receives location information on a one-time basis and via one or more audible signals that convey the relative locations of other nodes of the group. An example may be initiating a button press or other action and hearing a response in the form of audible signal "pings" that convey direction and distance of one or more other nodes. Such "pings" may be node-type specific, such as a tone that enable the listener to discern between drones and people.

In one embodiment, the positional indication is provided via manipulation of the received voice stream. The manipulation may be performed by adjusting the volume, including the relative left-ear signal and right-ear signal volume level or relative left-ear signal and right-ear signal delay, phase or a combination of these or other techniques such as using the Head-Related Transfer Function (HRTF). The received voice or a locally generated audio signal may also be transformed using techniques such as the VisiSonics Algorithm (http://realspace3daudio.com/realspacewildcat/), OpenAL (http://kcat.strangesoft.net/openal.html) or other methods such as adding intra-aural delay offset, diffuse-noise and reverberation or other effects.

In some embodiments, positional indication may be provided only in the horizontal plane, or in vertical plane (elevation), or the horizontal plane combined with elevation, which may be useful in groups that include drones or where the terrain has variable elevation, such as on slopes.

In another embodiment, the positional indication may be configured to provide relative locations of collections of nodes. In one example, the relative location of a collection of nodes may be indicated using the relative location of the approximate center of the collection of nodes.

Position Indication Using GPS Data

Figure 5:
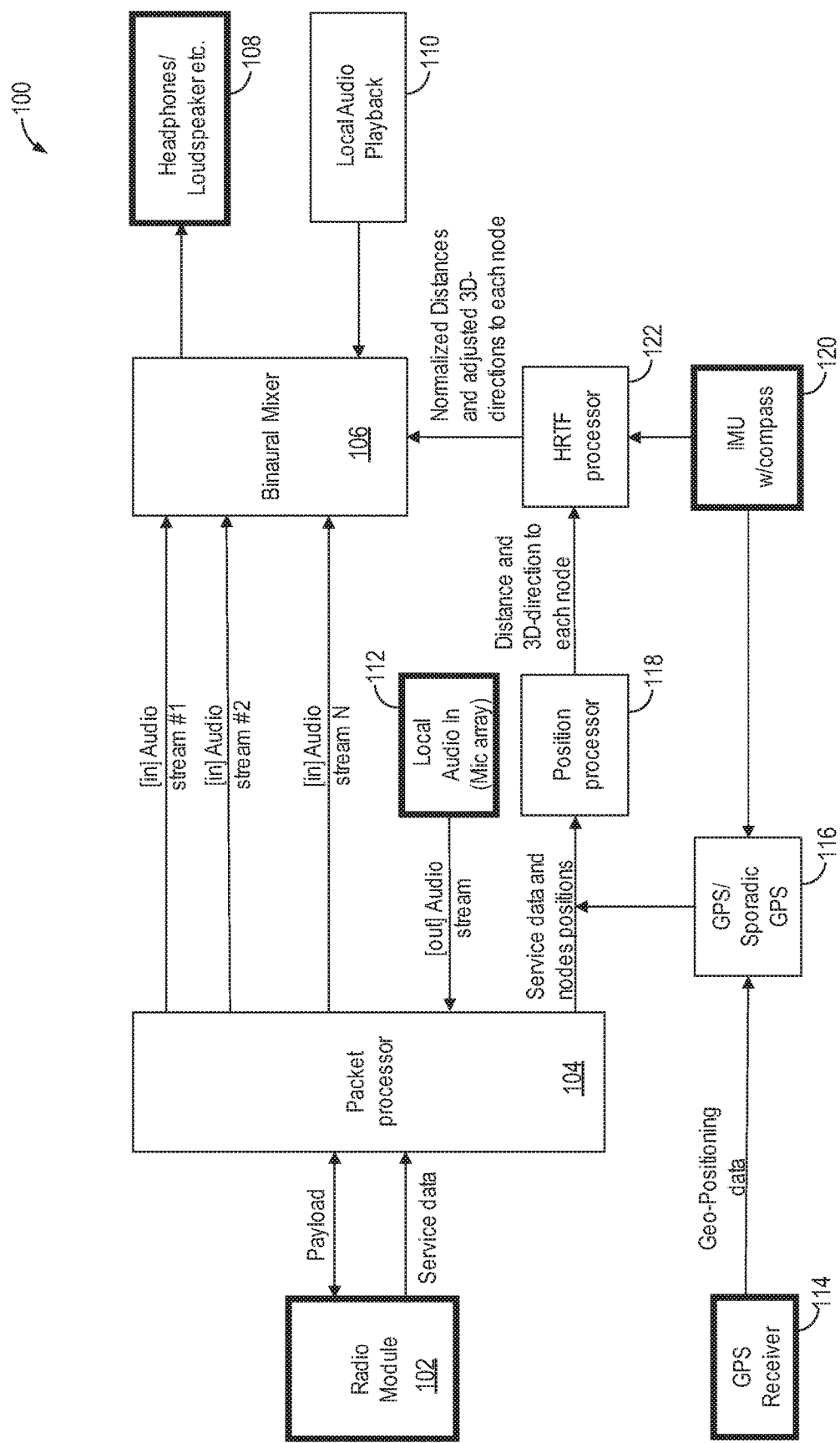
FIG. 5 is a functional diagram of the portable communication device using GPS for position determination in some embodiments.

FIG. 5 is a functional diagram of the portable communication device using GPS for position determination in some embodiments. FIG. 5 illustrates the software and hardware architecture of a portable communication device 100 using GPS for absolute positioning. The portable communication device 100 can be one of several similarly constructed devices used to form a group of portable communication devices for providing wireless full duplex voice communication between users of the portable communication devices in the group.

Referring to FIG. 5, a portable communication device 100 implements position tracking using GPS data. The portable communication device 100 includes a radio module 102 to transmit and receive payload data. The radio module 102 may also provide additional data such as signal strength for RSSI. The radio module 102 is in communication with a packet processing module 104 which processes the received data packets. The radio module 102 may also provide service data to the packet processing module 104. In some embodiments, the packet processing module 104 is implemented in a microcontroller of the portable communication device. In some embodiments, the packet processing module 104 buffers the incoming and outgoing audio streams, splits the audio stream into audio payload stream, and combines the payload stream into audio streams and align the audio streams over time. The packet processing module 104 may further process the service data.

In one embodiment, the packet processing module 104 processes the audio streams for each node separately. The audio streams 1 to N are provided to a binaural mixer 106 to mix all of the incoming audio streams. The mixed audio is provided for playback on the headphones or loudspeaker 108. In some cases, the portable communication device 100 is capable of local audio playback 110, such as music, podcast or voice feedback. The local audio playback is also provided to the binaural mixer 106 to be mixed with the incoming audio streams. In one embodiment, the local audio playback may be positioned in a different ways depending on the type of audio. For example, music playback may be provided without any positioning while voice feedback may be provided with positioning to imitate whispering in one's ear.

The portable communication device 100 receive local audio output from a mic array 112. The local output audio stream is provided to the packet processing module 104 to be processed and transmitted onto the radio module 102.

The portable communication device 100 implements position tracking using GPS. The portable communication device 100 may include an embedded GPS receiver 114. Alternately, the GPS receiver 114 may be configured on a connected user device, such as a mobile phone that is connected to the portable communication device. The GPS receiver, whether embedded or connected, receives GPS signals and provides geo-positioning data indicating the position of the portable communication device 100. The geo-positioning data is provided to a GPS module 116. The GPS module 116 generates the node position, or the position of the portable communication device, using the absolute geo-position data. The node position is provided to a position processor 118. In some embodiments, the GPS module 116 also receives inertial data from an inertial measurement unit (IMU) 120 which measures orientation, position and velocity of the portable communication device 100. The GPS module 116 uses the inertial data together with the absolute geo-positioning data to determine the node position. In some embodiments, the node position is determined periodically, such as at regular intervals. In other embodiments, the inertial measurement unit may include a barometer to provide altitude or relative height measurements.

The position processor 118 also receives node position data for other nodes in the group from the incoming data packets. The packet processing module 104 provides the node position data of the other nodes to the position processor 118. The position processor 118 creates and tracks a map of all the nodes in the group using the node position data received. That is, the position processor 118 creates a map including itself as the subject node and all the other nodes in the group. In the present embodiment, the node positions are determined using absolute geo-positioning based on GPS data. In other embodiments, the node positions can be determined using absolute and/or relative geo-positioning data from a GPS receiver, using geo-positioning data with inertial measurement data, using RSSI (Received Signal Strength Indicator) or using other positioning determination techniques.

In embodiments of the present invention, the position processor 118 creates a three-dimensional map of the subject node and all the other nodes using the node position data received. The three-dimensional map of the node positions enable the distance and three-dimensional direction to be determined to each node from the subject node. The determined distance and 3D direction data of each node are provided to a HRTF processor 122. The HRTF processor 122 performs Head-Related Transfer Function (HRTF) which adjusts the direction of the node based on the head orientation. In some embodiments, the HRTF processor 122 also receives the inertial measurement data from the inertial measurement unit 120.

In embodiments of the present invention, the HRTF processor 122 normalizes the distances of the nodes to within a range, such as between a minimum distance (DIST_MIN) and a maximum distance (DIST_MAX). In particular, regardless of the real distance, all incoming audio streams should be well audible. To ensure that all incoming audio streams are audible, all distances are normalized to the

[DIST_MIN, DIST_MAX] range. In one example, the values for DIST_MIN and DIST_MAX are chosen such that: (1) at DIST_MAX, the audio stream is still well audible; and (2) difference in loudness between audio streams placed at 1/N intervals of (DIST_MAX−DIST_MIN) is enough to estimate what stream position is closer to the listener. In one example, N is the number of nodes in the group. In other words, the difference in loudness between audio streams at intervals of the range is sufficient to indicate the relative distances of the other portable communication devices to the subject portable communication device being the listener.

The HRTF processor 122 generates normalized distances to all nodes and also generates adjusted 3D directions to each node from the subject node. The HRTF processor 122 provides the normalized distances and adjusted directions to the binaural mixer 106.

The binaural mixer 106, receiving the normalized distances and adjusted directions for each node and the audio stream from each node. The binaural mixer 106 virtually places each audio stream in 3D space using the normalized distances and directions to each node in the group. The binaural mixer 106 produces a binaural audio stream that indicates the relative location of the other nodes relative to the subject node. The binaural mixer 160 may fade out some audio stream based on the source of the audio stream.

In some embodiments, the binaural mixer 106 may implement real-positioning algorithm. In other embodiments, the binaural mixer 106 may implement other algorithms to provide virtual position of audio streams to create a presence experience without the use of positioning data.

In one embodiment, the positioning may be real 3D positioning or simplified positioning. With simplified 3D positioning, the elevation may be determined depending on the type of the objects. For example, speaking persons are at the same level as the listener while flying drones may be placed at an elevated position.

Figure 6:
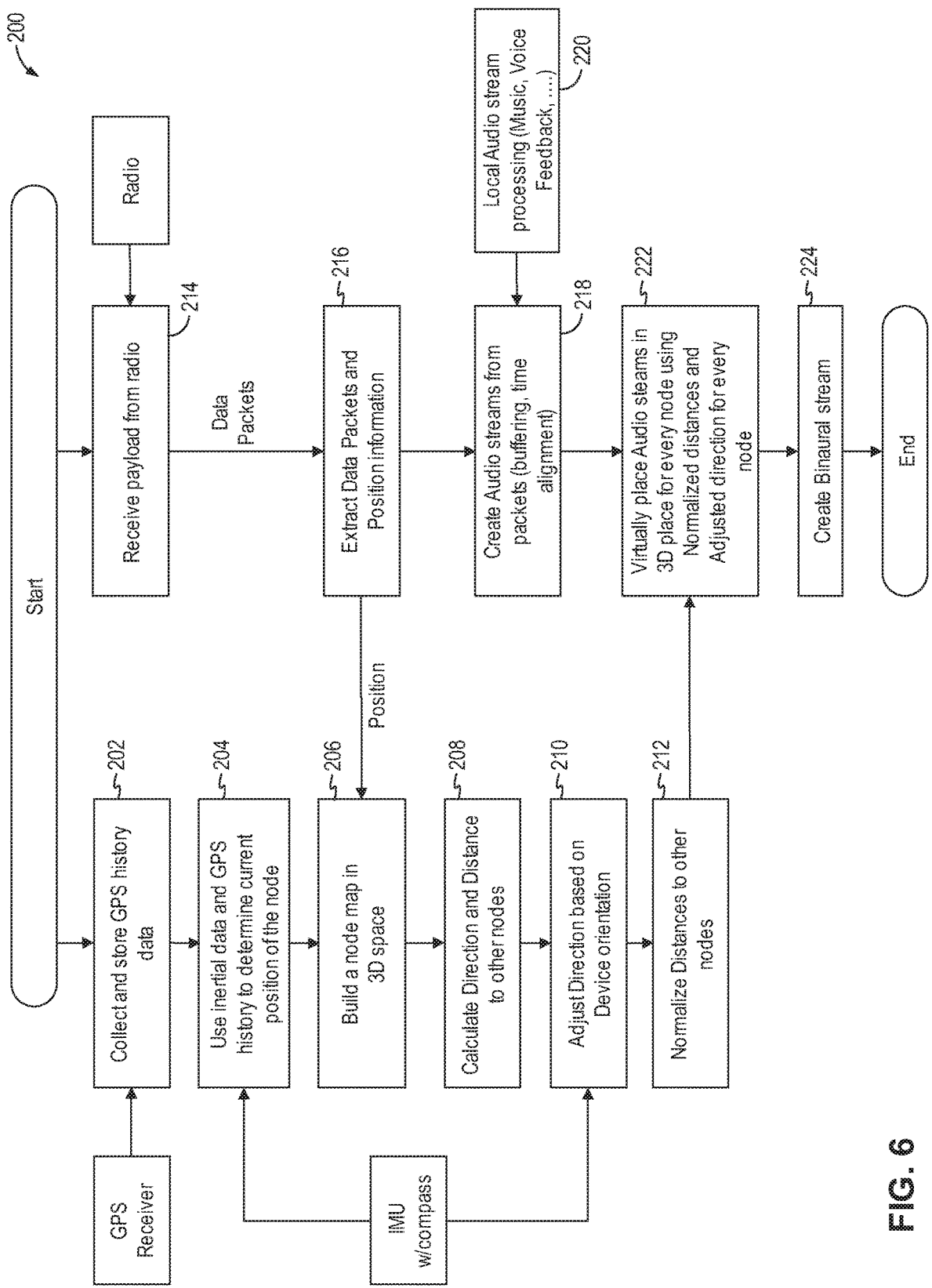
FIG. 6 is a flowchart illustrating the position indication method using GPS in some embodiments.

FIG. 6 is a flowchart illustrating the position indication method using GPS data in some embodiments. The position indication method 200 can be implemented in a portable communication device, such as the portable communication devices described above with reference to FIGS. 2-3.

Referring to FIG. 6, a position indication method 200 collects GPS data of the nodes, when available, for the most accurate position data (202). For example, the GPS data can be geo-positioning data and generated by a GPS receiver. In the event that GPS data is not available at the moment, the inertial measurement unit sensor may be used to provide data to extrapolate position of the nodes from the previously known GPS position. In some cases, this is referred to as the Sporadic GPS mode (204).

Meanwhile, the method 200 also receives payload from the radio (214). The method 200 processes the payload and extracts from the payload the data packets and position information of the other nodes (216). In particular, the data packets contain different types of data including voice and positional data, such as GPS data. Accordingly, the data packets received from the other nodes in the group contain positional information of the other nodes. For example, the positional information may include the GPS data of the other nodes, where the GPS data is generated by the GPS receiver associated with the respective nodes.

The method 200 creates audio streams from the received data packets (218). The method 200 may perform buffering and time alignment on the audio stream. The method 200 may also receive and process a local audio stream (220).

Meanwhile, the method 200 uses the position information of the other nodes and the positional information of the subject node to build a node map in a three dimensional space (206). Using the node map, the method 200 calculates the directions and distances to the other nodes from the subject node (208). The method 200 adjusts the direction based on the head orientation (210). The head orientation can be the head of the user or the direction the device is facing. The device can be the portable communication device or a smartphone to which the portable communication device is connected or embedded. The head orientation can be determined from inertial measurement data provided by an inertial measurement unit with a digital compass. Finally, the method 200 normalizes the distances to other nodes (212). For example, the method 200 may normalize the distances to other nodes to within a predetermined range.

With the distances and direction to the other nodes thus determined, the method 200 virtually places the audio streams in a 3D space for every node in the group using the normalized distance and the adjusted direction (222). The method 200 then creates the binaural stream (224). For example, the method 200 mixes the audio streams from all of the nodes and places the audio streams in the 3D space using the normalized distance and adjusted direction to form the binaural stream. The binaural stream can then be playback to the subject node. In other words, the method 200 modifies the audio stream of each node based on the location in the 3D space. For example, the volume may be faded or the audio stream may be positioned on the one side or the other side relative to the subject node. In this manner, the position indication method 200 determines the relative locations of nodes within a group and provides a position indication for the nodes.

In some embodiments, the position indication method 200 may provide the position indication using other means, besides modifying the audio stream. For example, the position indication method 200 may provide other audible indication of positions, such as a beep, or may provide non-audible indication of positions, such as on a display.

Figures 7, 7A, 7B:
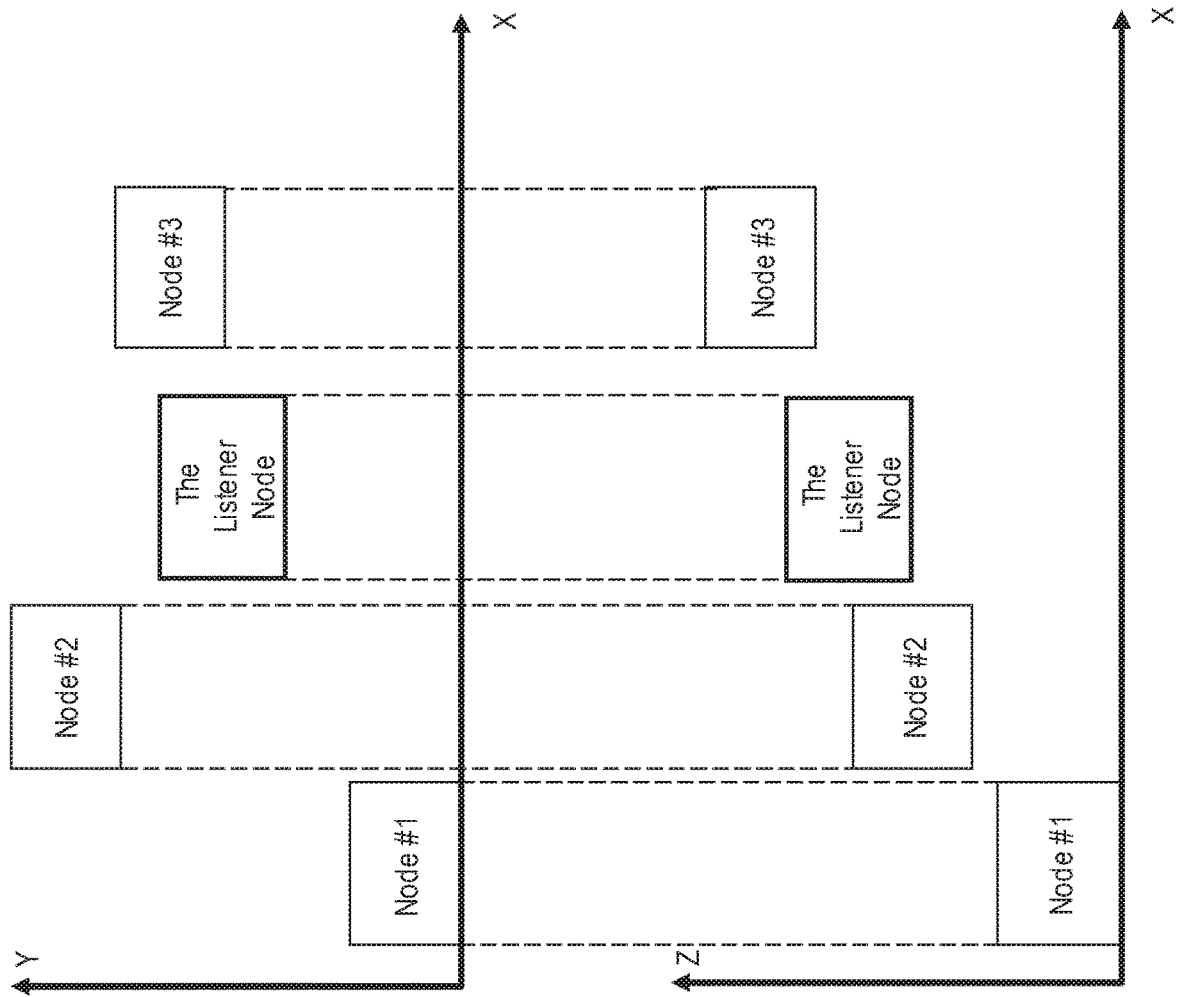
FIG. 7, which includes
FIGS. 7(a) and 7(b), is a plot illustrating the distributed positioning of the nodes in a virtual 3D space using GPS data for location determination in some examples.

FIG. 7, which includes FIGS. 7(*a*) and 7(*b*), is a plot illustrating the distributed positioning of the nodes in a virtual 3D space using GPS data for location determination in some examples. FIG. 7 illustrates the distribution of three nodes relative to the subject node, denoted Listener Node. The relative locations of the nodes within a horizontal plane (X, Y) are illustrated in FIG. 7(*a*). For example, the listener node is located between Nodes #2 and 3 in the horizontal plane distribution. The relative locations of the nodes in the elevation direction (Z) are illustrated in FIG. 7(*b*). For example, Node #1 is at the lowest elevation while the listener node is positioned between Nodes #2 and 3 in the elevation direction.

With the virtual 3D map thus created for all the nodes relative to the listener node, the portable communication device can then determine the distance and direction of each node relative to the subject node. The relative location of the other nodes can be further enhanced by adjusting for the head orientation of the subject node, as described above.

Position Indication Using RSSI Data

Figure 8:
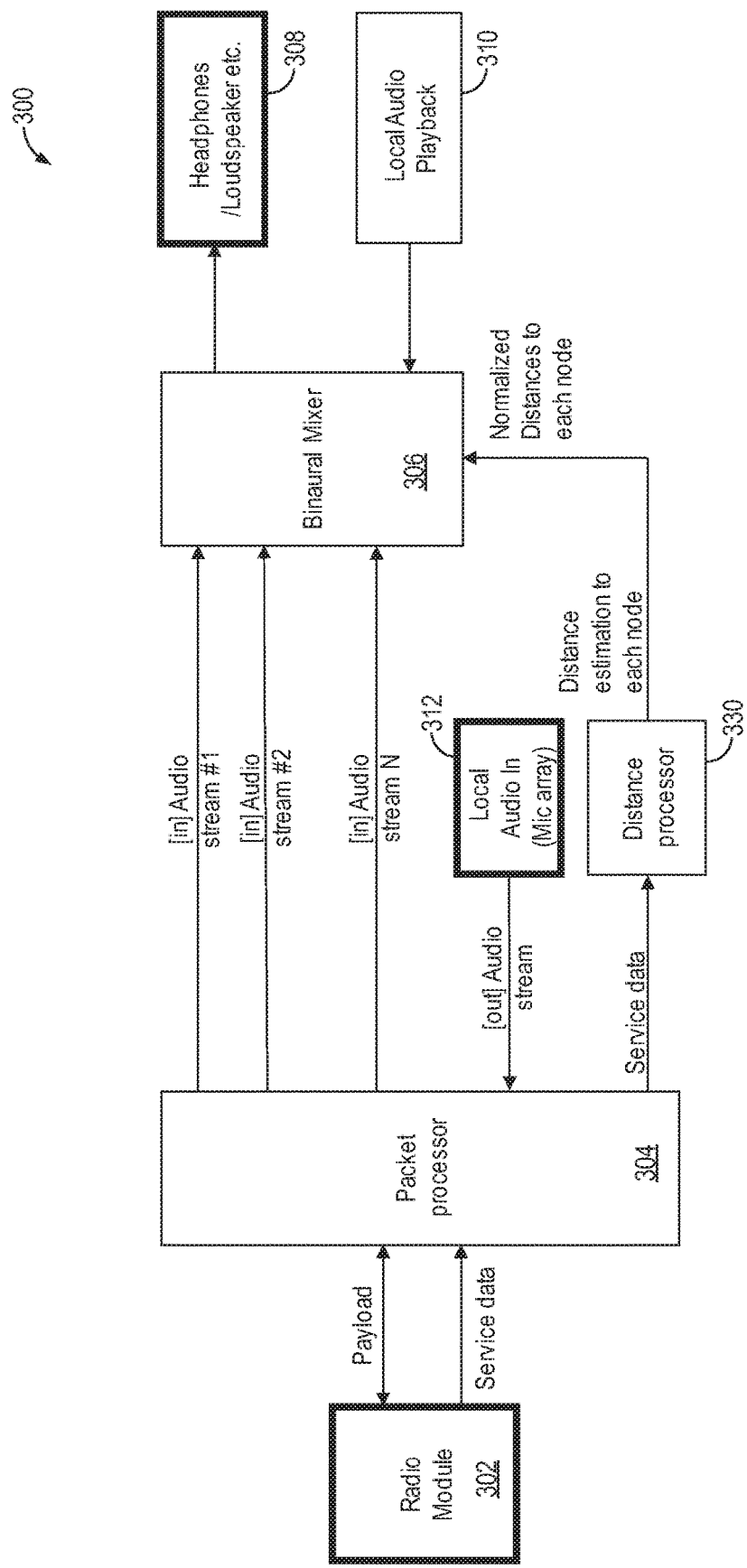
FIG. 8 is a functional diagram of the portable communication device using RSSI-based relative positioning for position determination in some embodiments.

FIG. 8 is a functional diagram of the portable communication device using RSSI-based relative positioning for position determination in some embodiments. FIG. 8 illustrates the software and hardware architecture of a portable communication device 300 implementing RSSI-based relative positioning. The portable communication device 300 can be one of several similarly constructed devices used to form a group of portable communication devices for providing wireless full duplex voice communication between users of the portable communication devices in the group.

Referring to FIG. 8, a portable communication device 300 implements position tracking using RSSI data. The portable communication device 300 includes a radio module 302 to transmit and receive payload data. The radio module 302 provides additional data such as signal strength data or RSSI data. The radio module 302 is in communication with a packet processing module 304 which processes the received data packets. The radio module 302 may also provide service data to the packet processing module 304. In some embodiments, the packet processing module 304 is implemented in a microcontroller of the portable communication device. In some embodiments, the packet processing module 304 buffers the incoming and outgoing audio streams, splits the audio stream into audio payload stream, and combines the payload stream into audio streams and align the audio streams over time. The packet processing module 304 may further process the service data, such as the RSSI data.

In one embodiment, the packet processing module 304 processes the audio streams for each node separately. The audio streams 1 to N are provided to a binaural mixer 306 to mix all of the incoming audio streams. The mixed audio is provided for playback on the headphones or loudspeaker 308. In some cases, the portable communication device 300 is capable of local audio playback 310, such as music, podcast or voice feedback. The local audio playback is also provided to the binaural mixer 306 to be mixed with the incoming audio streams. In one embodiment, the local audio playback may be positioned in a different ways depending on the type of audio. For example, music playback may be provided without any positioning while voice feedback may be provided with positioning to imitate whispering in one's ear.

The portable communication device 300 receive local audio output from a mic array 312. The local output audio stream is provided to the packet processing module 304 to be processed and transmitted onto the radio module 302.

The portable communication device 300 implements position tracking using RSSI-based relative positioning. The portable communication device 300 includes a distance processor 330 configured to receive the service data from the packet processing module 304 and to generate the distance estimation for each node in the group. In the present embodiment, the service data includes RSSI data which provides the level of received power as a proxy for distance to the subject node. In particular, the radio 302 receives audio signals from the other nodes in the group where the audio signals contain service data such as RSSI data indicating the received power level. The packet processing module passes the service data including the RSSI data of the other nodes to the distance processor 330. The distant processor 330 generates distance estimation for every node using the received RSSI data from each node. In other embodiments, besides RSSI data, the service data may include other distance estimation data such as link quality, error rate, or range estimation based on time to travel over the air.

In embodiments of the present invention, the distance processor 330 normalizes the distances of the nodes to within a range, such as between a minimum distance (DIST_MIN) and a maximum distance (DIST_MAX). In particular, regardless of the real distance, all incoming audio streams should be well audible. To ensure that all incoming audio streams are audible, all distances are normalized to the [DIST_MIN, DIST_MAX] range. In one example, the values for DIST_MIN and DIST_MAX are chosen such that: (1) at DIST_MAX, the audio stream is still well audible; and (2) difference in loudness between audio streams placed at 1/N intervals of (DIST_MAX−DIST_MIN) is enough to estimate what stream position is closer to the listener. In one example, N is the number of nodes in the group.

The distance processor 330 generates normalized distances to all nodes and provides the normalized distances to the binaural mixer 306. The binaural mixer 306 receives the normalized distance for each node and the audio stream from each node. Using the normalized distance and the total number of audio streams, the binaural mixer 306 virtually places each audio stream evenly distributed in a 3D space in front of the subject node. The binaural mixer 306 produces a binaural audio stream that indicates the relative location of the other nodes relative to the subject node. The binaural mixer 360 may fade out some audio stream based on the source of the audio stream.

Figure 9:
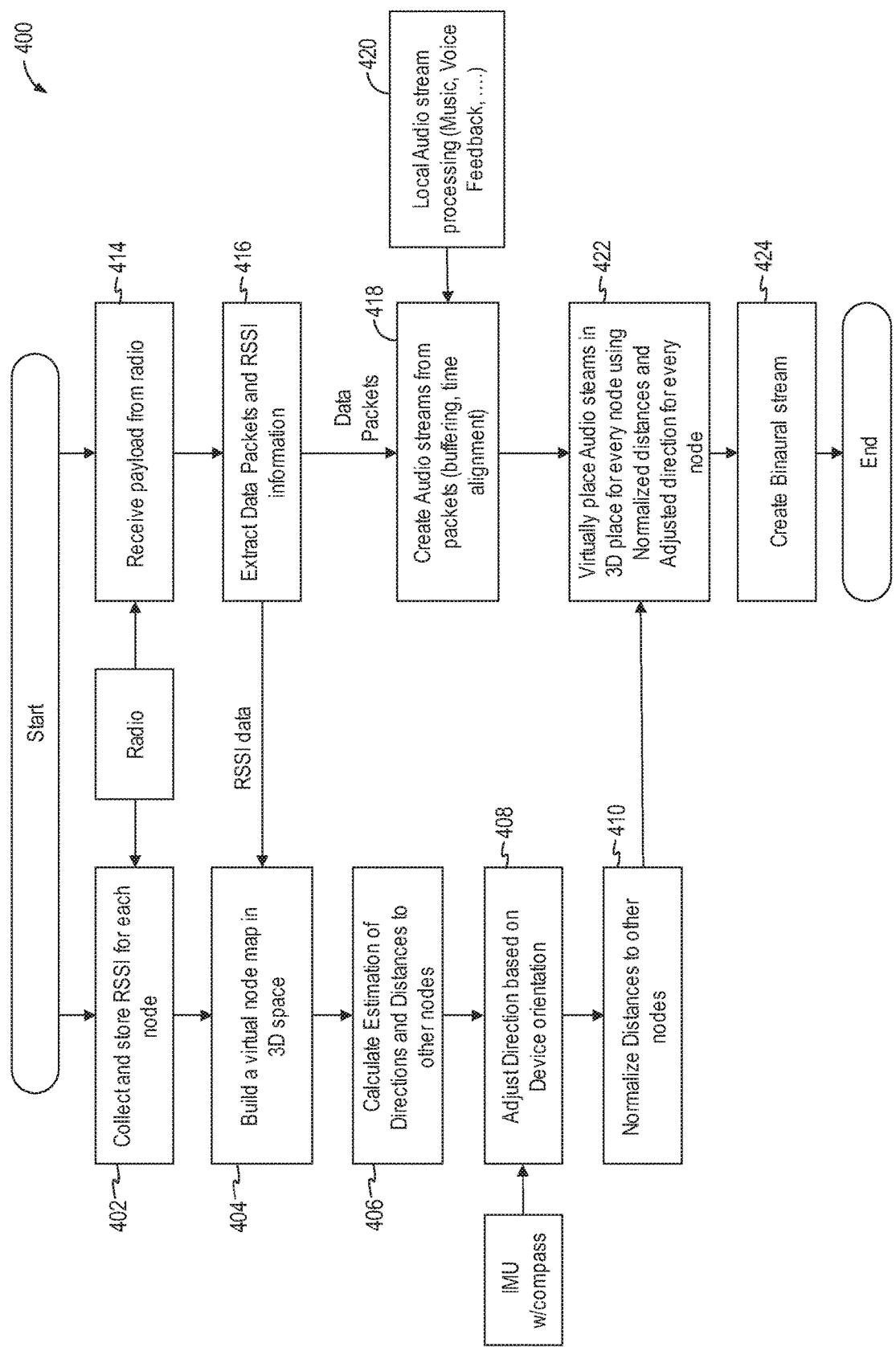
FIG. 9 is a flowchart illustrating the position indication method using received signal strength relative positioning in some embodiments.

FIG. 9 is a flowchart illustrating the position indication method using received signal strength relative positioning in some embodiments. The position indication method 400 can be implemented in a portable communication device, such as the portable communication devices described above with reference to FIGS. 2-3.

Referring to FIG. 9, a position indication method 400 starts by receiving from the radio the payload (414) and collecting the RSSI data for each node transmitting to the subject node (402). In particular, the audio signals being received contains different types of data including voice, RSSI and other data. The RSSI data for each node can be collected from the received data packet from that node.

The method 400 processes the payload and extracts from the payload the data packets associated with each of the nodes (416). The method 400 processes the data packets by creating audio streams from the data packets (418). The method 400 may perform buffering and time alignment on the audio streams. Meanwhile, the method 400 may also receive and process a local audio stream (420).

The method 400 uses the RSSI position information of the other nodes collected from the incoming audio signal to build a virtual node map in a three dimensional space (404). Using the virtual node map, the method 400 calculates estimation of the directions and distances to the other nodes from the subject node (406). The method 400 adjusts the direction based on the head orientation (408). The head orientation can be the head of the user or the direction the device is facing. The device can be the portable communication device or a smartphone to which the portable communication device is connected or embedded. The head orientation can be determined from inertial measurement data provided by an inertial measurement unit with a digital compass. Finally, the method 400 normalizes the distances to other nodes (410). For example, the method 400 may normalize the distances to other nodes to within a predetermined range.

With the distances and direction to the other nodes thus determined, the method 400 virtually places the audio streams in a 3D space for every node in the group using the normalized distance and the adjusted direction (422). The method 400 then creates the binaural stream (424). For example, the method 400 mixes the audio streams from all of the nodes and places the audio streams in the virtual 3D space using the normalized distance and adjusted direction to form the binaural stream. The binaural stream can then be playback to the subject node. In other words, the method 400 modifies the audio stream of each node based on the location in the virtual 3D space. For example, the volume may be faded or the audio stream may be positioned on the one side or the other side relative to the subject node. In this manner, the position indication method 400 determines the relative locations of nodes within a group and provides a position indication for the nodes.

In some embodiments, the position indication method 400 may provide the position indication using other means, besides modifying the audio stream. For example, the position indication method 400 may provide other audible indication of positions, such as a beep, or may provide non-audible indication of positions, such as on a display.

FIG. 10, which includes FIGS. 10(a) to 10(c), is a plot illustrating node positions in a virtual 3D space in some examples. FIG. 10 illustrates the distribution of three or four nodes relative to the subject node, denoted Listener Node. The relative locations of the nodes within a horizontal plane (X, Y) are illustrated in FIGS. 10(a) and 10(b). Referring to FIG. 10(a), the distribution of four nodes (Nodes #1 to #4) in a virtual space relative to the listener node is estimated using the RSSI data of the four nodes. The nodes may be evenly distributed as the position determination is an estimation only using RSSI data.

Referring to FIG. 10(b), the distribution of three nodes (Nodes #1 to #3) in a virtual space relative to the listener node is estimated using the RSSI data of the three nodes. In both cases, the relative position of one node versus another node can be estimated by evaluating the received power level of the audio signals to the nodes. The node associated with a lower received power can be assumed to be further away from the listener node. In this example, the nodes are distributed using a uniform separation function so that the nodes are distributed evenly in front of the listener node.

FIG. 10(c) illustrates the relative locations of the nodes in the elevation direction (Z). In this case, Node #3 is estimated to be at a higher elevation than Nodes #1 and 2. With the virtual 3D map thus created for all the nodes relative to the listener node, the portable communication device can then determine the distance and direction of each node relative to the subject node.

The position indication method of the present invention provides many advantages. For example, knowing the relative location of nodes in the group may be valuable in addressing other issues, such as improving the performance of other communication systems, for example by improving the effectiveness of beam-steering of the transmitted voice radio signal in a voice communication system. In another example, there may be configurations in which the directional capability is activated where there are visual obstructions between nodes or at some minimum distance threshold, where it may be likely that a person may be out of sight of other members or nodes, such as the person is behind a wall. In some cases, the directional capability may be interrupted where it is likely that nodes are within close proximity or within sight. Another benefit of the position indication method of the present invention is that the position information thus obtained enable the optimizing of a routing path between nodes.

The above detailed descriptions are provided to illustrate specific embodiments of the present invention and are not intended to be limiting. Numerous modifications and variations within the scope of the present invention are possible. The present invention is defined by the appended claims.

What is claimed is:

1. A method in a first portable communication device, the first portable communication device being in radio communication with a second portable communication device, the method comprising:

pairing the first portable communication device with the second portable communication device to form a group, the portable communication devices in the group being configured to perform simultaneous radio frequency voice communication between the portable communication devices in the group;

receiving data packets originating from the second portable communication device, the data packets comprising at least position information data;

receiving at the first portable communication device a command from a user of the first portable communication device to obtain a location of the second portable communication device;

in response to the command, determining, using the positional information data, a relative location of the second portable communication device to the first portable communication device, wherein the relative location comprises a direction and a distance of the second portable communication device relative to the first portable communication device;

generating, at the first portable communication device, a signal to indicate the relative location of the second portable communication device to the first portable communication device, the signal comprising an audible signal modified in response to the relative location of the second portable communication device;

providing the signal on the first portable communication device to convey to the user of the first portable communication device the relative location of the second portable communication device;

generating an audio stream from the data packets received from the second portable communication device, the data packets comprising audio data and position information data;

modifying the audio stream using the direction and the distance determined for the second portable communication device to place the audio stream of the second portable communication device in a three-dimensional space;

forming a binaural stream using the modified audio stream of the second portable communication device; and providing playback of the binaural stream on the first portable communication device.

2. The method of claim 1, wherein generating, at the first portable communication device, the signal to indicate the relative location of the second portable communication device to the first portable communication device comprises:

generating, at the first portable communication device, an audio signal to indicate the relative location of the second portable communication device, the audio signal having volume or loudness modified in response to the relative location of the second portable communication device.

3. The method of claim 1, wherein determining, using the positional information data, the relative location of the second portable communication device to the first portable communication device comprises:

forming, using the positional information data, a virtual node map in a three-dimensional space, the virtual node map indicating the relative location of the second portable communication device to the first portable communication device; and determining, using the virtual node map, the relative location including a direction and a distance of the second portable communication device relative to the first portable communication device.

4. The method of claim 3, wherein determining, using the virtual node map, the relative location including the direction and the distance of the second portable communication device relative to the first portable communication device comprises:

adjusting the direction of the second portable communication device relative to the first portable communication device in response to a head orientation of the first portable communication device, the head orientation being indicative of a direction the first portable communication device is facing.

5. The method of claim 4, wherein adjusting the direction of the second portable communication device relative to the first portable communication device in response to the head orientation of the first portable communication device comprises:

determining, using inertial measurement data, the head orientation of the first portable communication device.

6. The method of claim 2, further comprising:

normalizing the distance of the second portable communication device relative to the first portable communication device to within a range between a minimum distance and a maximum distance, the maximum distance being a distance where the audio signal is still audible and the difference in loudness between audio signals at intervals of the range is sufficient to indicate the relative location of the second portable communication device to the first portable communication device.

7. The method of claim 1, wherein receiving data packets originating from the second portable communication device comprises:

receiving data packets originating from the second portable communication device, the data packets comprising at least one of geo-positioning data or received signal strength indicator based relative positioning data.

8. The method of claim 3, wherein forming, using the positional information data, the virtual node map in a three-dimensional space comprises:

providing spatial approximation divided in quadrants as the virtual node map in the three-dimensional space; and placing the second portable communication device in a respective quadrant using the positional information data.

9. A portable communication device being a first portable communication device in radio communication with a second portable communication device, the portable communication device comprising:

a user interface, one or more digital processors in electronic communication with the user interface, and at least one memory in electronic communication with the one or more digital processors, the at least one memory is configured to provide the digital processors with instructions which when executed cause the processor to:

pair the first portable communication device with the second portable communication device to form a group, the portable communication devices in the group being configured to perform simultaneous radio frequency voice communication between the portable communication devices in the group;

receive data packets originating from the second portable communication device, the data packets comprising at least position information data;

receive at the first portable communication device a command from a user of the first portable communication device to obtain a location of the second portable communication device;

in response to the command, determine, using the positional information data, a relative location of the second portable communication device to the first portable communication device, wherein the relative location comprises a direction and a distance of the second portable communication device relative to the first portable communication device;

generate, at the first portable communication device, a signal to indicate the relative location of the second portable communication device to the first portable communication device, the signal comprising an audible signal modified in response to the relative location of the second portable communication device;

provide the signal on the first portable communication device to convey to the user of the first portable communication device the relative location of the second portable communication device;

generate an audio stream from the data packets received from the second portable communication device, the data packets comprising audio data and position information data;

modify the audio stream using the direction and the distance determined for the second portable communication device to place the audio stream of the second portable communication device in a three-dimensional space;

form a binaural stream using the modified audio stream of the second portable communication device; and provide playback of the binaural stream on the first portable communication device.

10. The portable communication device of claim 9, wherein the at least one memory is further configured to provide the digital processors with instructions which when executed cause the processor to:

receive data packets originating from the second portable communication device, the data packets comprising at least one of geo-positioning data or received signal strength indicator based relative positioning data.

11. The method of claim 1, wherein receiving a command to obtain a location of the second portable communication device comprises:

receiving a voice command or a button press to obtain a location of the second portable communication device.

12. The method of claim 1, wherein generating, at the first portable communication device, the signal to indicate the relative location of the second portable communication device to the first portable communication device further comprises:

generating, at the first portable communication device, a signal on a visual display to indicate the relative location of the second portable communication device.

13. The portable communication device of claim 9, wherein the at least one memory is further configured to provide the digital processors with instructions which when executed cause the processor to:

receive a voice command or a button press to obtain a location of the second portable communication device.

14. The portable communication device of claim 9, wherein the at least one memory is further configured to provide the digital processors with instructions which when executed cause the processor to:

generate, at the first portable communication device, an audio signal to indicate the relative location of the second portable communication device, the audio signal having volume or loudness modified in response to the relative location of the second portable communication device.

15. The portable communication device of claim 9, wherein the at least one memory is further configured to provide the digital processors with instructions which when executed cause the processor to:

generate, at the first portable communication device, a signal on a visual display to indicate the relative location of the second portable communication device.

16. The portable communication device of claim 14, wherein the at least one memory is further configured to provide the digital processors with instructions which when executed cause the processor to:

normalize the distance of the second portable communication device relative to the first portable communication device to within a range between a minimum distance and a maximum distance, the maximum distance being a distance where the audio signal is still audible and the difference in loudness between audio signals at intervals of the range is sufficient to indicate the relative location of the second portable communication device to the first portable communication device.

17. The portable communication device of claim 9, wherein the at least one memory is further configured to provide the digital processors with instructions which when executed cause the processor to:

form, using the positional information data, a virtual node map in a three-dimensional space, the virtual node map indicating the relative location of the second portable communication device to the first portable communication device; and determine, using the virtual node map, the relative location including a direction and a distance of the second portable communication device relative to the first portable communication device.

* * * * *